Figure 1:
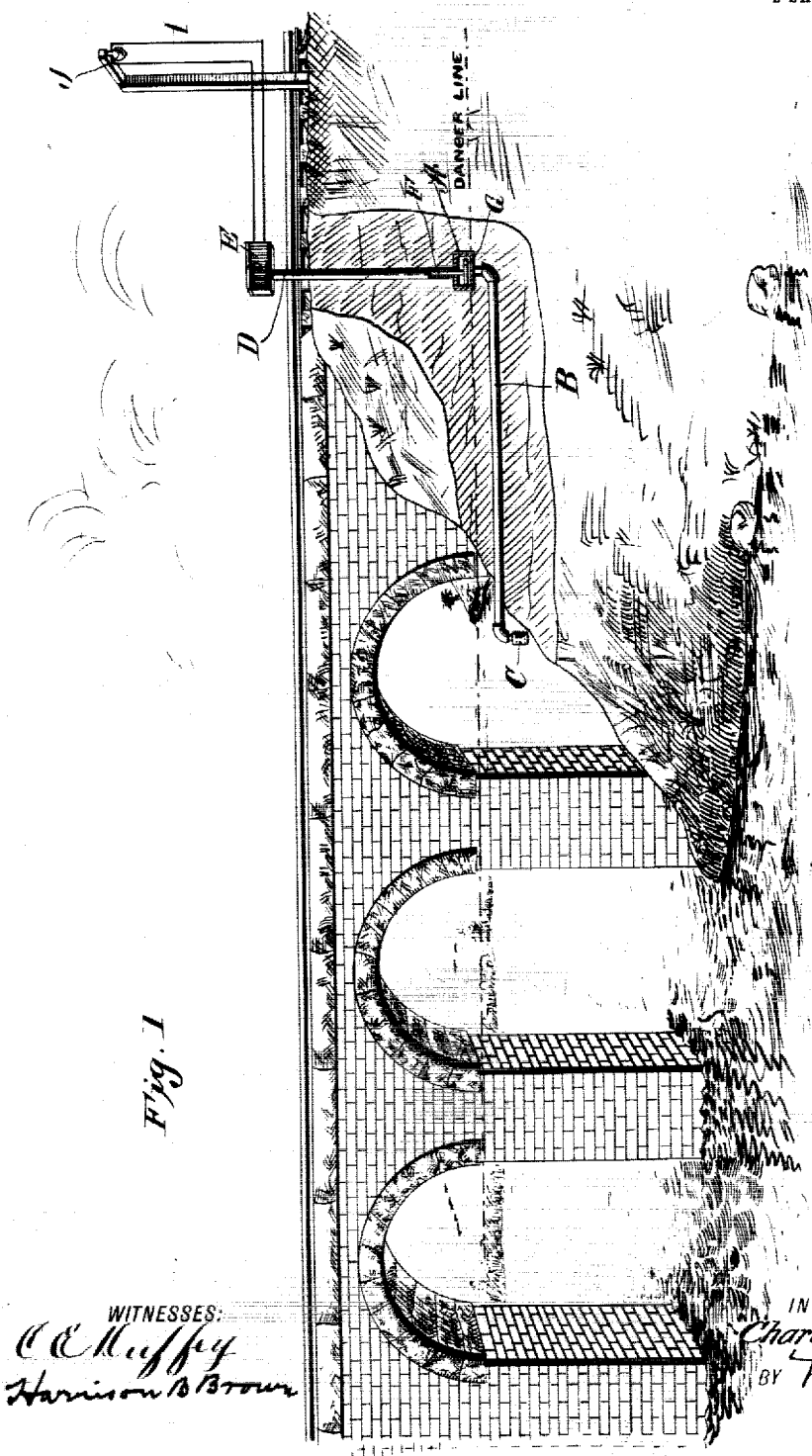

No. 812,025. PATENTED FEB. 6, 1906.
C. R. DOWLER.
SIGNAL.
APPLICATION FILED JAN. 14, 1905. RENEWED DEC. 18, 1905.
2 SHEETS—SHEET 2.
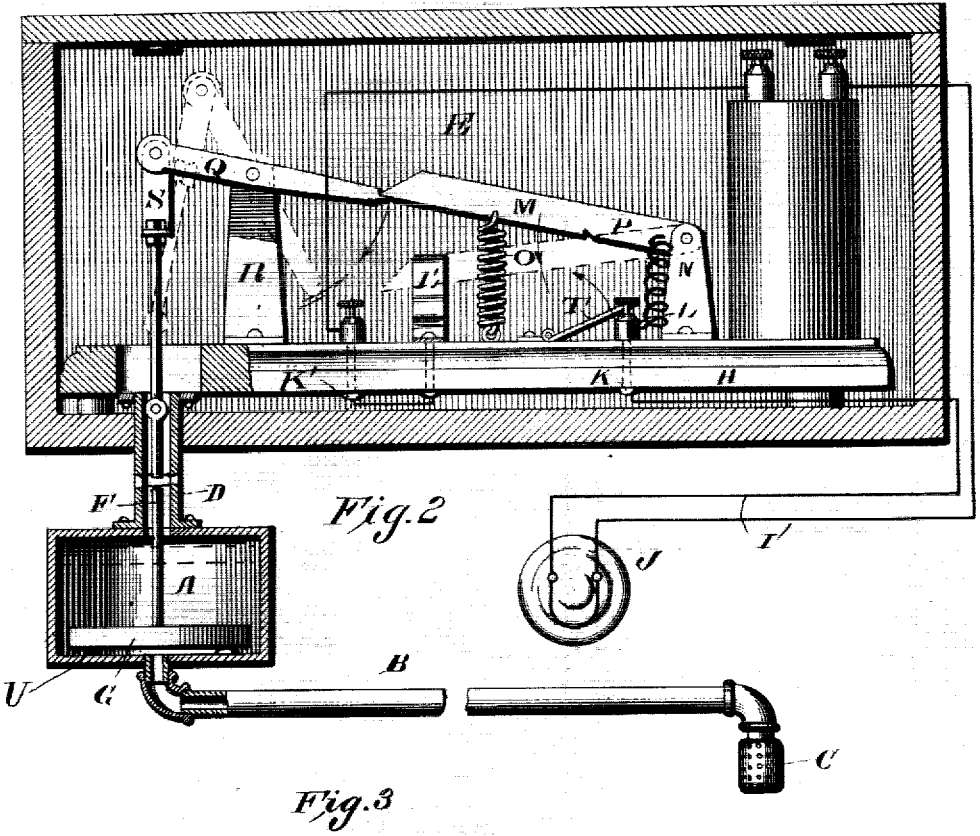
Fig. 2
Fig. 3
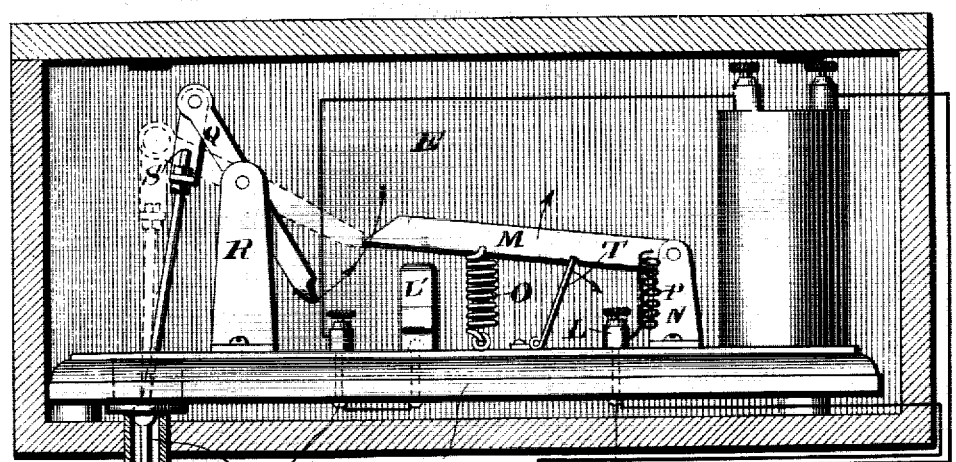
WITNESSES:
C. E. Duffy
Harrison B. Brown
INVENTOR
Charles R. Dowler
BY Munn & Co.
ATTORNEYS

UNITED STATES PATENT OFFICE.

CHARLES R. DOWLER, OF LAMAR, COLORADO, ASSIGNOR TO THE COLORADO RAILWAY SIGNAL COMPANY, A CORPORATION OF COLORADO.

SIGNAL.

No. 812,025.  Specification of Letters Patent.  Patented Feb. 6, 1906.

Application filed January 14, 1905. Renewed December 18, 1905. Serial No. 292,272.

*To all whom it may concern:*

Be it known that I, CHARLES R. DOWLER, a citizen of the United States, residing at Lamar, in the county of Prowers and State of Colorado, have invented a new and Improved Signal, of which the following is a specification.

My invention relates, more definitely stated, to means indicating dangerous high-water level at a railroad or other bridge.

The object had in view is to provide a signal of this character involving new, improved, and simplified means for effecting the display of a visual or audible signal indicating dangerous high level of the water in a river at a bridge or other place.

The invention consists of the special means hereinafter fully described, shown in the accompanying drawings, and as pointed out in the claims.

In the drawings, Figure 1 is a view illustrating my invention in use at the approach of a railroad-bridge across a river. Fig. 2 is an enlarged view, part in section, showing the means employed in the makeup of my invention at normal position; and Fig. 3 is a similar view showing the means employed at another position.

In carrying out my invention I employ a suitable tank A and embed it in the river-bank substantially as shown in Fig. 1 of my drawings. A pipe B is extended from the lower side of the tank A to a point projecting through the river-bank, and on this or the outer end thereof I arrange any suitable strainer C. The tank should be located at an elevation with its lower side in horizontal plane with the dangerous high-water line of the river. D denotes a tube extending upwardly from the upper side of the tank A to a suitable case E, located suitably above ground substantially as shown in Fig. 1.

In the tube D, I arrange a rod F, having its lower end bracedly secured to the upper side of a float G, arranged in the tank A, the rod's upper end being made projecting into the case E for the purpose as will appear farther on.

On any suitable base H in the case E, I mount devices operating to close an electrical circuit I through a signal device J, visual or audible, and terminals K K'. In the circuit I any suitable battery may be employed and the same be located in the case E. The terminal K has a binding-post L at its upper end, and the upper end of the terminal K' is fashioned into a suitable yielding forked socket L'.

M denotes a conductive arm having pivotal support at one end on a post N. The arm M is yieldingly held with its free end in the socket L' by tension of a spring O. Circuit is completed through the arm and the socket L' by means of a connected wire P, extending from the binding-post L substantially as shown in Figs. 2 and 3.

Q denotes an oscillating arm having suitable connection to the upper end of a post R. One end of the oscillating arm Q is secured to the projecting end of the rod F by any obvious connecting means S, affording adjustment. It is intended in the working of the arm Q that its free end should project adapted for engagement with the under side of the free end of the arm M when the latter is elevated above the socket L' to a point about half of its upward adjustment, as will be understood upon reference to Figs. 2 and 3. The arm M is supported at the adjustment just described by a dog T, hinged to the upper side of the base H. The float is supported slightly above the opening of the pipe B in the box A by suitable projections U, as shown in Fig. 2.

Obviously the conformation of the several features employed in the makeup of my invention may be variously modified, and therefore I do not desire to be restricted to the form thereof illustrated in the several figures of my drawings.

The construction of my invention will be understood from the above description. In the use thereof, with water in the river at normal level, the float G will rest upon the projections U in the box A, and in this the normal position of the float it is intended that the free end of the oscillating arm Q shall be at position holding the free or circuit-closing end of the arm M to full-adjusted position above the forked terminal L. (Shown by full lines in Fig. 2.) Now it is apparent that should the water-level in the river be caused to rise above danger-line water will flow into the box A through the pipe B and the float G be elevated, which action through connection of the rod F will effect downward movement of the free end of the oscillating arm and releasing action of the free end of the arm M, when the latter by tension of the spring O will be drawn down to circuit-closing contact with the forked arms L'. The circuit I being closed, the signal device J will indicate that water in the river is at or above high-water mark. The signal device is intended to be located sufficiently distant from the bridge, if on a railroad, to permit stopping of the train of cars at a point safely from the bridge approach or for notifying an employee of the railroad. When the circuit I is closed as just described, the signal device will continue indicating that the river is dangerously high, and upon notice thereof to prevent running down of the battery the employee should, without unnecessary delay, cut out the battery and reset the circuit-closing devices in position for operation when another dangerous rise of the river occurs. The movable parts are shown in full lines at normal position in Fig. 2. This figure shows the said parts in dotted lines to adjusted position, while the dangerous high water continues and the circuit I is closed.

In practicing my invention the case E is provided with a removable or hinged cover with means for locking it closed. In resetting the signal with the case opened the arm M may be proped up, as shown in Fig. 3, by means of the hinged dog T. In this position of the arms M the circuit I is open. While the water in the river remains at or above dangerous line, it is apparent that the oscillating arm will by the float and connections be retained with its free end at its lowermost adjustment, as shown in Fig. 3. It is further apparent that upon lowering of the water-line, the arm M being propped up, as described, that the free end of the arm Q will, by settling action of the float and connections, be adjusted upwardly to engagement with the free end of the arm M and lift the latter to its normal position. (Shown by full lines in Fig. 2.) The dog T being thus freed its free end will move to normal position. (Shown in Fig. 2.) With the parts in position as last described obviously upon the next dangerous rise of the river the arm Q will be adjusted and the circuit I closed, as hereinbefore described.

My invention by slight modification may be adapted for uses other than a high-water signal, and therefore I do not desire to be restricted to the use described nor to the particular conformation of the parts illustrated in the several figures of my drawings.

Having thus described my invention, what I claim as new, and desire to secure by Letters Patent, is—

1. The combination in a signal, of a box having an opening wherethrough fluid may enter into the box, a float in the box, a circuit-closer adapted for operation through rising action of the float, an electrical circuit having a battery and signal device therein, and means whereby the circuit-closer may be held set ready for operation through suitable connection, upon the next rising action of the float.

2. The combination in a signal, of a box suitably located at high-water level, a pipe extending from the box to position adapted to lead the high water into the box, a float in the box, a rod extending from the float, circuit-closing means wherewith the far end of said rod is connected, circuit-wires, a battery and a signal device, and means whereby the circuit-closer may be held set adapted to be operated by rising action of the float substantially as described.

3. The combination in a circuit-closer, of circuit-terminals, an arm yieldingly held at circuit-closing position, a free acting dog whereby said arm may be held out of circuit-closing position, means adapted to lift the circuit-closing arm to normal open-circuit position, and means operating the lifting-arm, substantially as described.

4. The combination in a signal employing a float and suitable connecting means, of a circuit-closer adapted for operation by a float and its connections, the circuit-closer consisting of an oscillating arm adapted for operation through the float connections, circuit-terminals, an arm yieldingly held completing circuit through the terminals, a dog whereby the circuit-closing arm may be held at open-circuit location and in position for engagement thereof by the free end of the oscillating arm, substantially as described.

CHARLES R. DOWLER.

Witnesses:
GEO. D. ROBINSON,
FRANK WHEELER.